United States Patent [19]
Bendetti

[11] Patent Number: 5,325,737
[45] Date of Patent: Jul. 5, 1994

[54] COVER FOR LEVERS

[76] Inventor: Anthony M. Bendetti, P.O. Box 1676, Troy, N.Y. 12181-1676

[21] Appl. No.: 5,786

[22] Filed: Jan. 9, 1993

[51] Int. Cl.⁵ .................. B62K 21/26; G05G 1/04
[52] U.S. Cl. ............................. 74/551.9; 74/558.5
[58] Field of Search ............ 74/502.2, 523, 551.8, 74/551.9, 558

[56] References Cited

U.S. PATENT DOCUMENTS

| | | | |
|---|---|---|---|
| 583,781 | 6/1897 | Barber | 74/551.9 |
| 588,794 | 8/1897 | Granger | 74/551.9 |
| 2,506,197 | 5/1950 | Burger | . |
| 2,508,812 | 5/1950 | Burger | . |
| 2,672,342 | 3/1954 | Griffin | . |
| 3,803,941 | 4/1974 | Yoshikawa | 74/523 |
| 3,845,954 | 11/1974 | Case | 74/558 X |
| 4,445,396 | 5/1984 | Shimano | 74/551.9 X |
| 4,459,871 | 7/1984 | Shimano | . |
| 4,981,737 | 1/1991 | Rico | 74/551.9 X |
| 5,123,296 | 6/1992 | Chang | 74/558 X |

FOREIGN PATENT DOCUMENTS 13285 of 1896 United Kingdom ............ 74/551.9
25832 of 1901 United Kingdom ............ 74/551.9

OTHER PUBLICATIONS

Band-It-Idex, Inc., P.O. Box 16307 Denver, CO 80216, Tie-Loktool Model A250, P90387F.
Piedmont Aviation, Supply Aviation Supply Corporation, p. 1375, Milbar Safety Loire Tool.

*Primary Examiner*—Vinh T. Luong
*Attorney, Agent, or Firm*—Richard C. Litman

[57] ABSTRACT

A cover for levers and a method for making the same. The cover extends from an initial end to a terminal end of the lever. The cover is formed from a single strand of leather or other suitable material, a plurality of strands, or an elongated rectangular sheet partially serrated to provide a plurality of strands, each strand originating from an unserrated portion along the lateral edge. The strand or strands are wrapped about the lever and secured in position. The strands may be braided about the lever following any of a number of braiding patterns. After the lever is wrapped, the excess length of the plurality of strands may be fashioned so as to be permitted to hang freely.

18 Claims, 5 Drawing Sheets

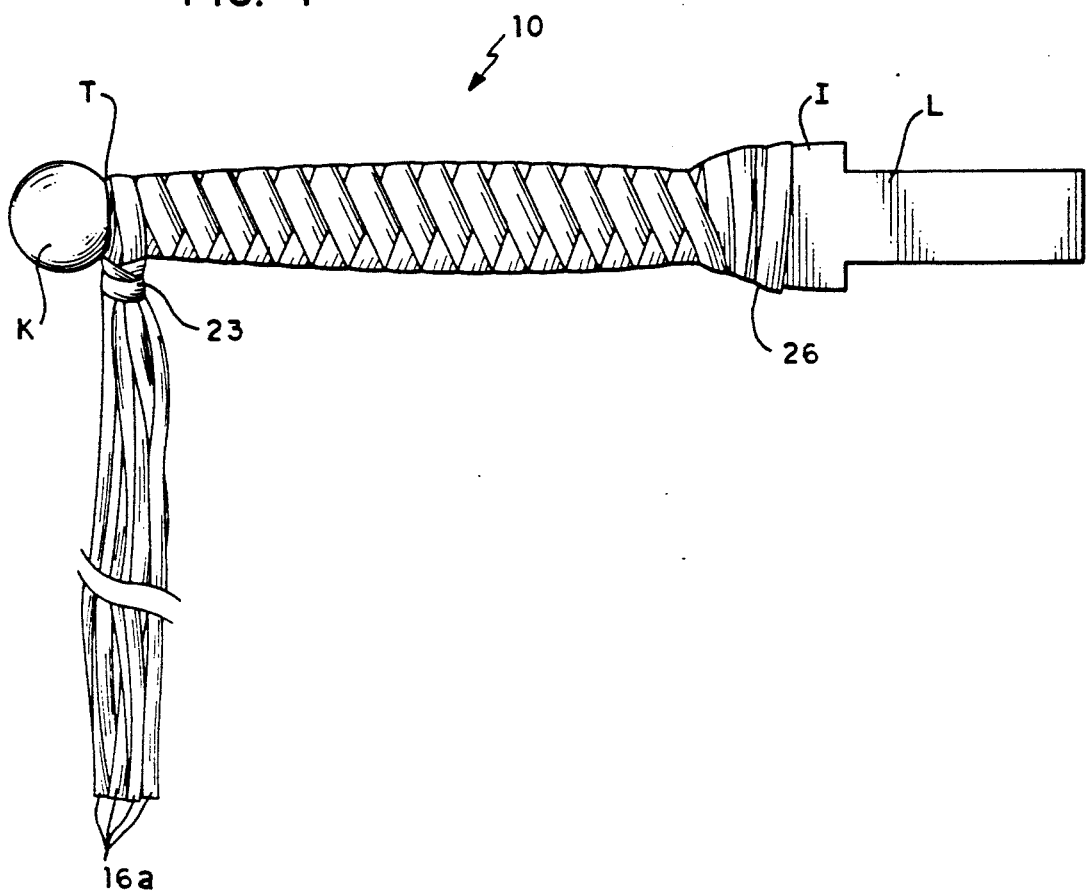
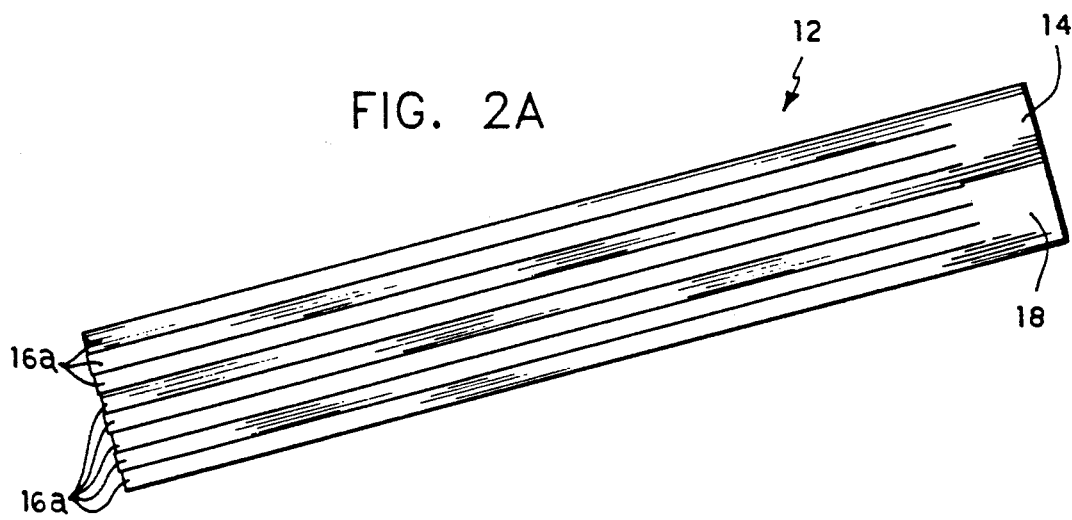

COVER FOR LEVERS

BACKGROUND OF THE INVENTION

1. Field of the Invention

The present invention relates to a cover for levers and the like and more particularly, to a cover for motorcycle clutch and brake levers and a method of making the same.

2. Description of the Prior Art

Lever covers enhance the control of the lever and the operation of the machinery associated therewith. Clutch and brake lever covers for motorcycles and the like improve the control of the levers and the motor vehicle. A cover, however, which may easily loosen up, slip, and twist through use over a period of time may reduce the control of the machinery thereby, increasing the risk. A cover which fits tightly and securely over levers would reduce the risk of the cover becoming deformed and would assure optimum operation and control of the machinery. Handle grips which improve control as well as provide comfort to a user's hands are well known in the art. Examples of some grips are shown U.S. Pat. No. 2,506,197 issued May 2, 1950 and U.S. Pat. No. 2,508,812 issued May 23, 1950, each to Sel H. Burger. Burger discloses hollow grips, each of which is frictionally engagable by an end portion of a handle bar. A plurality of flexible elements in the form of streamers are secured to the grips by fasteners.

Another grip is shown in U.S. Pat. No. 2,672,342 issued Mar. 16, 1954 to John A. Griffin illustrating handgrips, one of which is shown in FIG. 5 as being a braided ribbon formed of seven strands of twine tightly braided to form a flat braided ribbon which is wound in tight convolutions about a handle.

Another patent which may be of interest is U.S. Pat. 4,459,871 issued Jul. 17, 1984 to Keizo Shimano.

None of the above inventions and patents, taken either singularly or in combination, is seen to describe the instant invention as claimed.

SUMMARY OF THE INVENTION

The present invention is a lever cover. More specifically, the present invention is a cover, preferably fabricated of leather the like, for motorcycle cycle clutch and brake levers and a method for making the same. The cover extends between an initial end and a terminal end of the lever and is formed from at least one elongate strand. In one embodiment, an elongated strip may be partially serrated to provide a plurality of strands integral with an unserrated lateral portion. The unserrated portion is wrapped about an initial end of the lever and secured in position. The lever is then wrapped extending from the initial end to the terminal end. Any one of a variety of braiding patterns may be used. After the lever is wrapped, the strands are secured position at the terminal end of the lever to ensure that the same do not become unwrapped. Each end may be wrapped by an independent strand or by an excess length of one of the strands so as to conceal the securing means. An excess length of one of the strands may also be used to bundle the excess of the other strands. The excess length of the plurality of strands may be severed and disposed of or may be permitted to hang freely so as to provide a fringe.

Accordingly, it is a principal object of the invention to provide an improved cover for levers which covers the lever between the initial end and the terminal end thereof.

It is another object to provide a cover for levers which includes an unserrated portion wrapped about an initial end of the lever and secured in position so as to permit the strands to be wrapped about the lever.

It is a further object to provide a cover for levers in which any of a variety of braiding patterns may be followed.

Still another object is to provide a cover for levers in which the strands are secured in position at both an initial end and a terminal end to ensure that the strands do not become loose.

Yet another object is to provide a cover for levers in which an excess length of one of the strands is wrapped around an end to conceal the securing means.

Another object is to provide a cover for levers in which an excess length of one of the strands is used to bundle the excess of the plurality of strands.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is a front elevational view of a lever cover in accordance with the present invention.

FIG. 2A is a perspective view of the elongated, rectangular, serrated strip.

Similar reference characters denote corresponding features consistently throughout the attached drawings.

DETAILED DESCRIPTION OF THE PREFERRED EMBODIMENTS

Figure 2B:
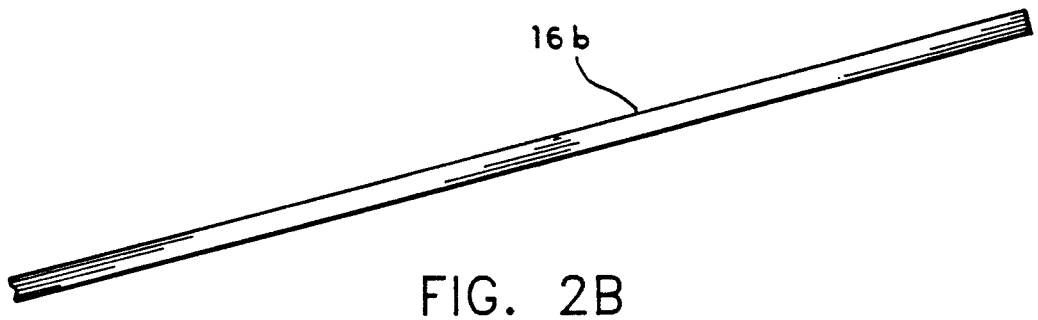
FIG. 2B is a perspective view of the single strand.
Figure 2C:
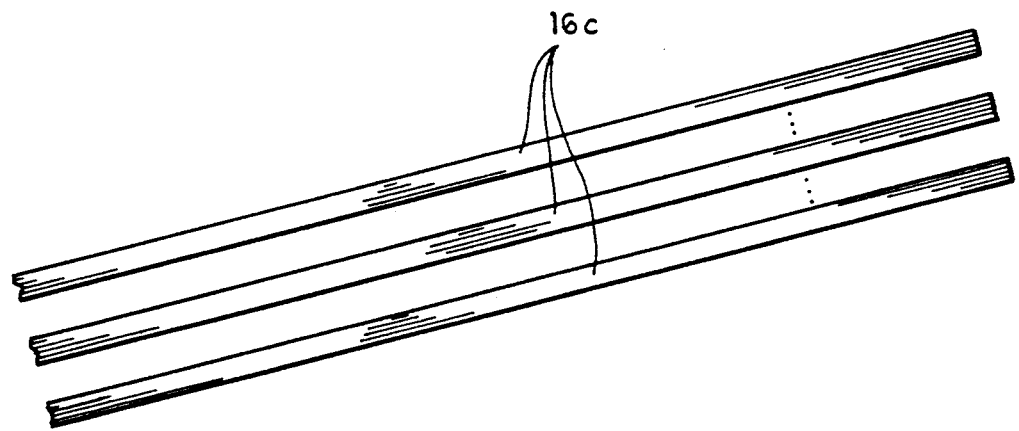
FIG. 2C is a perspective view of the plurality of strands.
Figure 7:
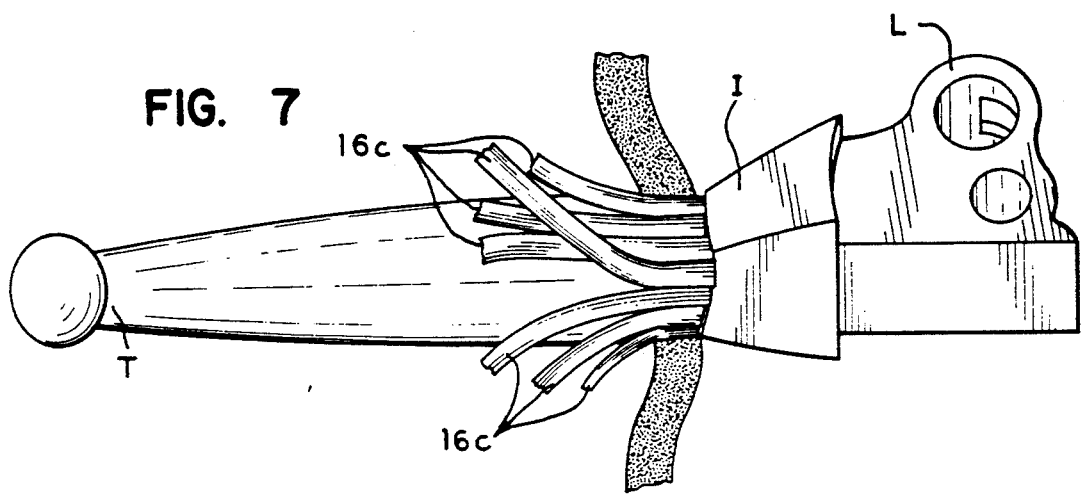
FIG. 7 is a perspective view of the attachment of the plurality of strands to the initial end of a lever.
Figure 8:
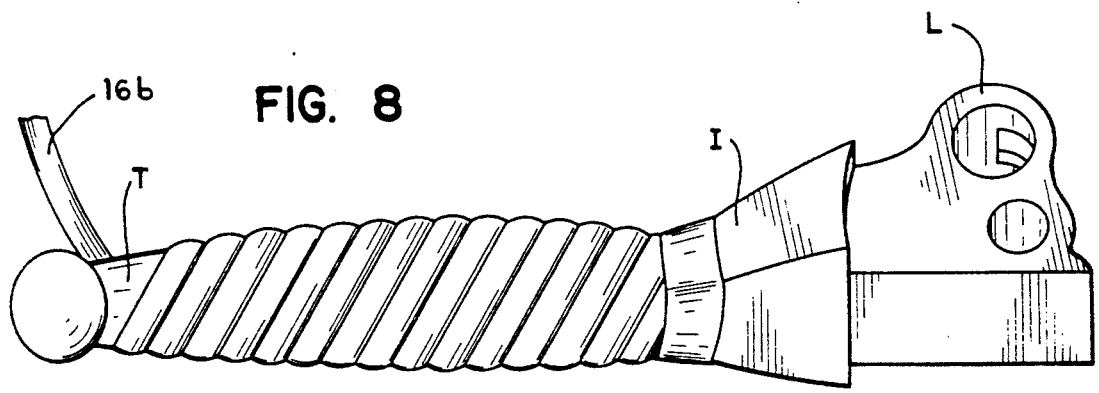
FIG. 8 is a perspective view of a lever partially covered with a single strand.

The present invention as shown in FIG. 1 is a covering 10 for levers L, such as motorcycle clutch and brake levers. The covering 10 is braided between an initial end I of the lever L and a terminal end T. The covering 10 is formed from an elongate rectangular sheet or strip 12, as is shown in FIG. 2A. The covering 10 may be formed from a single strand as shown in FIGS. 2B and 8 or a plurality of strands 16c as shown in FIGS. 2C and 7.

The strip 12 or the strands 16b, 16c are preferably leather or the like and may be any of a number of colors. The sheet 12 is serrated longitudinally up to a predetermined distance from a lateral edge 14 to provide a fringe or plurality of strands 16a in FIG. 2A.

Figure 3:
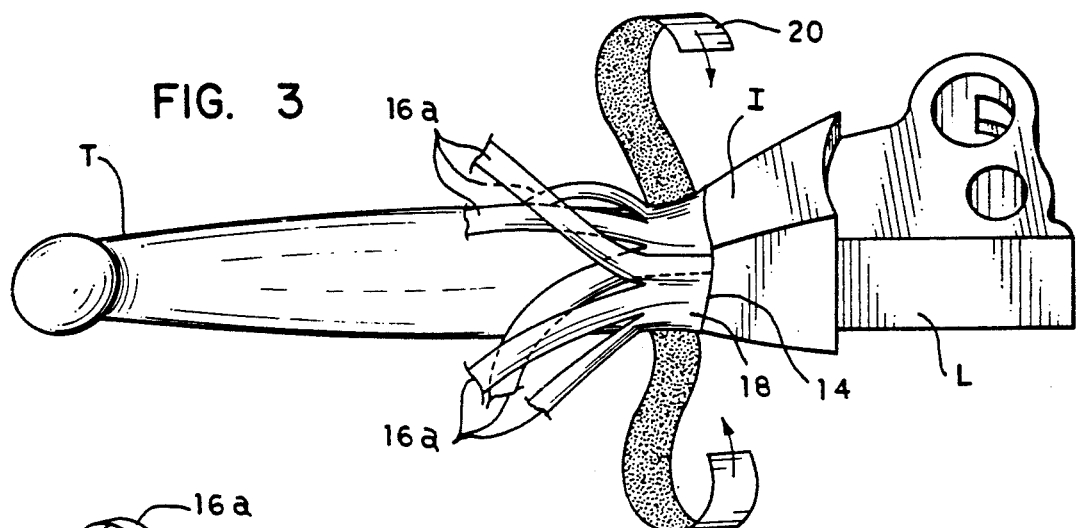
FIG. 3 is a perspective view of the attachment of the elongated strip to the initial end of a lever.

As shown in FIG. 3, the unserrated portion 18 along the lateral edge 14 is circumferentially wrapped about the initial end I of the lever L. Tape 20 may be wrapped around the initial end I of the lever L over the unserrated portion 18 to maintain the unserrated portion 18 in its wrapped position.

Figure 4:
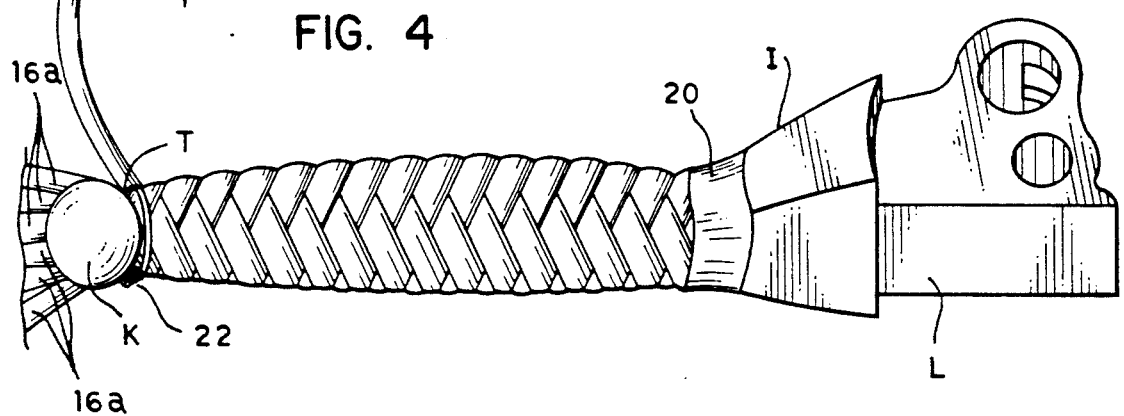
FIG. 4 is a perspective view of the lever shown in FIG. 3 with the elongated strip braided from the initial end thereof to terminal end.
Figure 4A:
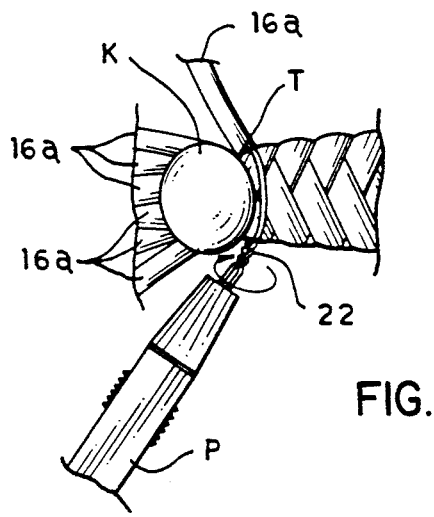
FIG. 4A is a side elevational view of the safety wire being twisted about the terminal end of the lever shown in FIG. 4.

After the tape 20 is applied, as shown in FIG. 4, the strands are braided about the lever L extending from the initial end I to the terminal end T thereof. Any of a variety of braiding patterns may be used. After the braiding is completed, a length of safety wire 22 is applied about the terminal end T of the lever L over the braided strands 16a and is twisted tight so as to prevent the braided strands 16a from unraveling. Safety wire twister tools, such as the tool P partially shown in FIG. 4A, are commonly known. These tools ensure that the safety wire 22 is twisted tightly while reducing the risk of breaking the safety wire 22. One such tool is a right hand twist square nose tool, Model 12W5 manufactured by Milbar of the United States. The safety wire 22 is preferably twisted adjacent the underside of the lever L and folded against the underside of the lever L in the direction the knob K. An excess length of one of the plurality of strands 16a is wrapped around the terminal end T of the lever L over the safety wire 22 as shown in FIG. 4.

Figure 5:
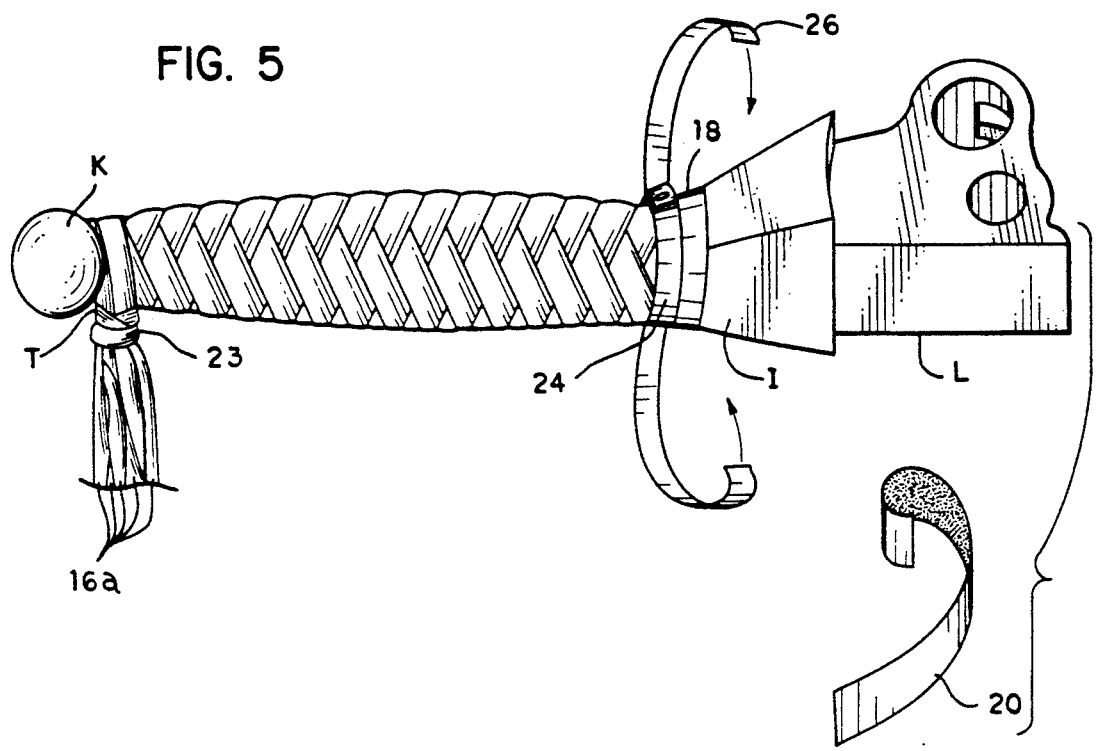
FIG. 5 is a perspective view of a band applied to the initial end of the lever shown in FIG. 4a and an excess length of one of the strands concealing the safety wire about the terminal end thereof.
Figure 6:
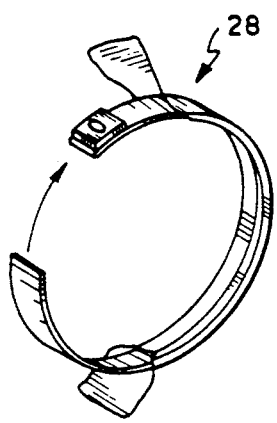
FIG. 6 is a perspective view of a covered band.
Figure 5A:
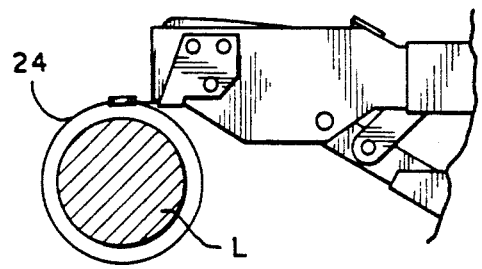
FIG. 5A is a side elevational view of the tool used to tighten the band shown in FIG. 5.

As shown in FIG. 5, once the safety wire 22 has been sufficiently concealed, a remaining portion of the excess length of strand concealing the safety wire 22 is tied in a knot 23, such as a fisherman's knot, so as to simultaneously maintain the same tightly about the terminal end T and bundle the remaining of the plurality of braided strands 16a. the tape 20 is now removed from about the initial end I of the lever L and a band 24 is applied in substitution of the tape 20. The band 24 is preferably a stainless steel band capable of sustaining environmental effects. The band 24 is applied about the initial end I of the lever L over the unserrated portion 18 in like manner as was the tape 20. The band 24 is tightened permanently in place to maintain the unserrated portion 18 in the desired position. The band 24 is preferable a BAND-IT TIE-LOK clamp manufactured by BAND-IT-IDEX, Incorporated of the United States. The BAND-IT TIE-LOK clamp may tightened and locked using a TIE-LOKTOOL, shown in FIG. 5A, also manufactured by BAND-IT-IDEX, Incorporated. With the band 24 in place, a strand 16 is wrapped and secured about the initial end I the lever L to physically conceal the band 24. Alternatively, the band 24 may be initially applied in substitution of the tape 20. However, by applying the tape 20 prior to braiding the strands 16, overlapping portions of the unserrated portion 18 are permitted to be adjusted prior to applying the band 24 to ensure that the covering 10 at the initial end I of the lever is as smooth and aesthetically pleasing as possible. As an alternative, a covered band 28, such as the band shown in FIG. 6, may be used to eliminate the step of wrapping the strand 26 about the initial end I of the lever L to conceal the band 24. Once the band 24 is secured to the initial end I of the lever L, the covering 10 is complete as is shown in FIG. 1.

Alternatively, the band may be used in substitution of the safety wire 22 and, conversely, the safety wire may be substituted in place of the band. Is should be understood that excess length of the strands may be severed at the knot and discarded or may be permitted to hang freely. Note that it is not critical which end of the lever L the strands 16b, 16c or the strip 12 are initially attached. However, it may be more practical to start at the initial end of the lever L shown in the drawings if it is desirable to permit the strands to hang freely as shown.

It is to be understood that the present invention is not limited to the sole embodiment described above, but encompasses any and all embodiments within the scope of the following claims,

I claim:

1. A cover used for a lever having an initial end and a terminal end, said cover comprising:
   at least one elongate strip wrapped around the lever so as to cover the same, said elongate strip comprises a longitudinal serrated portion providing a plurality of strands, said plurality of strands being braided around the lever from the initial end to the terminal end of the lever, and a lateral unserrated portion circumferentially wrapped around the initial end of the lever;
   first fixing means for securing said unserrated portion around the initial end of the lever; and
   second fixing means for securing said braided strands around the terminal end of the lever.

2. The cover according to claim 1, further comprising a plurality of elongate strips which are braided while wrapped around the lever.

3. The cover according to claim 1, wherein said first fixing means comprises a band.

4. The cover according to claim 1, wherein said second fixing means comprises a band.

5. The cover according to claim 1, further comprising first conceal means for physically concealing said first fixing means.

6. The cover according to claim 1, further comprising second conceal means for physically concealing said second fixing means.

7. The covering according to claim 5, wherein said first conceal means comprises an independent strand wrapped and secured over said first fixing means so as to conceal said first fixing means beneath said independent strand.

8. The covering according to claim 6, wherein said second conceal means comprises an independent strand wrapped and secured over said second fixing means so as to conceal said second fixing means beneath said independent strand.

9. The covering according to claim 1, wherein said first fixing means comprises a segment of safety wire.

10. The covering according to claim 1, wherein said second fixing means comprises a segment of safety wire.

11. A method for covering a lever having an initial end and a terminal end, said method comprising the steps of:
    wrapping at least one elongate strip around the lever at least between the initial end and the terminal end thereof;
    securing the elongate strip to the lever at the proximate end thereof by a first member;
    securing the elongate strip to the lever at the terminal end thereof by a second member; and
    physically concealing at least one of aid first or second members.

12. The method according to claim 11, further comprising the step of physically concealing the first member.

13. The method according to claim 11, further comprising the step of physically concealing the second member.

14. The method according to claim 11, wherein the elongate strip comprising:

a longitudinal serrated portion providing a plurality of strands; and a lateral unserrated portion circumferentially wrapped around the initial end of the lever, and wherein said step of wrapping the elongate strip wraps the inserrated portion circumferentially around the initial end.

15. The method according to claim 14, wherein said step of securing the elongate strip to the lever at the initial end secures the unserrated portion in position around the initial ends.

16. The method according to claim 14, further comprising the step of braiding the strands between the initial end and the terminal end.

17. The method according to claim 16, further comprising the step of bundling a remaining portion of the strands at the terminal end.

18. The method according to claim 17, further comprising the step of tying one of the strands into a knot at the terminal whereby the bundle is maintained.

* * * * *